United States Patent
Cariou et al.

(10) Patent No.: US 12,356,473 B2
(45) Date of Patent: Jul. 8, 2025

(54) METHOD AND APPARATUS USED IN WLAN NETWORKS

(71) Applicant: Intel Corporation, Santa Clara, CA (US)

(72) Inventors: Laurent Cariou, Milizac (FR); Thomas Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 933 days.

(21) Appl. No.: 17/234,740

(22) Filed: Apr. 19, 2021

(65) Prior Publication Data
US 2021/0243824 A1    Aug. 5, 2021

(51) Int. Cl.
| | | |
|---|---|---|
| *H04W 76/11* | (2018.01) | |
| *H04W 74/0808* | (2024.01) | |
| *H04W 84/12* | (2009.01) | |

(52) U.S. Cl.
CPC ........ *H04W 76/11* (2018.02); *H04W 74/0825* (2013.01); *H04W 84/12* (2013.01)

(58) Field of Classification Search
CPC . H04W 76/11; H04W 74/0825; H04W 48/12; H04W 84/12; G01R 15/186
See application file for complete search history.

(56) References Cited

U.S. PATENT DOCUMENTS

| | | |
|---|---|---|
| 2016/0112969 A1* | 4/2016 | Zhou |
| 2018/0199380 A1* | 7/2018 | Itagaki |
| 2018/0376339 A1* | 12/2018 | Hu |
| 2020/0288523 A1* | 9/2020 | Patil |
| 2023/0189328 A1* | 6/2023 | Xu |

FOREIGN PATENT DOCUMENTS

| | | |
|---|---|---|
| EP | 3324566 A1 | 5/2018 |
| WO | 2016060 805 A1 | 4/2016 |

OTHER PUBLICATIONS

The extended European search report for European Application No. 22151989.5, dated Jul. 12, 2022, 8 pages.

* cited by examiner

*Primary Examiner* — Iqbal Zaidi
(74) *Attorney, Agent, or Firm* — East IP P.C.

(57) ABSTRACT

The application provides a method, comprising: generating identifying information at an access point (AP), the identifying information including information relating to an energy detection (ED) threshold to be used for a channel in a wireless network; and broadcasting the identifying information via the channel.

10 Claims, 10 Drawing Sheets

| Element ID | Length | Element ID Extension | Encoding Type | Energy Detection Threshold |

| EDmin | EDmax | TxPowerMin | TxPowerMax | Slope | ns
METHOD AND APPARATUS USED IN WLAN NETWORKS

TECHNICAL FIELD

Embodiments of the present disclosure generally relate to wireless communications in a wireless local area network (WLAN), and in particular, to a method and apparatus used in a WLAN.

BACKGROUND

An Extremely High Throughput (EHT) network, also known as 802.11be network, achieves high throughput through a series of system features and various mechanisms.

BRIEF DESCRIPTION OF THE DRAWINGS

Embodiments of the disclosure will be illustrated, by way of example and not limitation, in conjunction with the figures of the accompanying drawings in which like reference numerals refer to similar elements and wherein.

DETAILED DESCRIPTION

Figure 1:
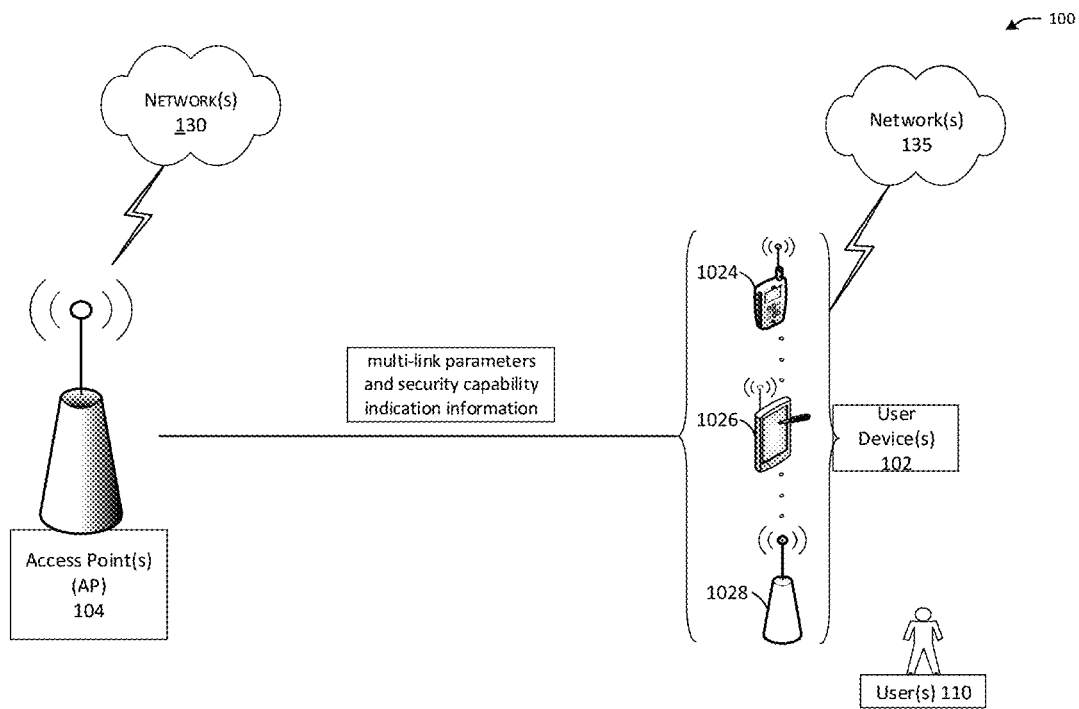
FIG. 1 is a network diagram illustrating an example network environment according to some example embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

802.11 has always used a mechanism to determine if the medium is busy or idle, and which is used by the channel access mechanisms. This mechanism is called CCA for clear channel assessment. Basically, every station (STA), if it wants to transmit, must observe a free channel (CCA equal idle) and respect other rules defined in 802.11 (typically wait for a certain duration to decrement a counter while still have CCA=0 and if that counter reaches zero, the STA can transmit). This CCA is made of 2 measurements and 2 thresholds, whether only energy is detected (Energy Detection (ED) threshold) or if a Wi-FI signal is detected (Packet Detection (PD) threshold).

Typically, for 20 MHz operation, 802.11 has always considered the two following thresholds:

ED at −62 dBm (20 dB above minimum mandatory sensitivity)

PD at −82 dBm (minimum mandatory sensitivity)

These thresholds are then adjusted depending on the band width (BW) of observation (ED=−59 dBm for a 40 MHz transmission).

Those values are always defined in the 802.11 standard, and they have always been known and used by the STAs without any information being needed to be carried by the access point (AP).

There is a trend of using a fixed −72 dBm ED threshold or an ED threshold that linearly varies with the transmission (TX) power of the user device between −72 dBm and −62 dBm (−72 dBm if the device transmits at or above 23 dBm, and −62 dBm if the device transmits below or at 13 dBm, and with a 1:1 slope for a TX power of the user device between 23 dBm and 13 dBm, with an ED between −72 and −62 dBm).

An aspect of the disclosure provides a method comprising: generating identifying information at an AP, the identifying information including information relating to an ED threshold to be used for a channel in a wireless network; and broadcasting the identifying information via the channel.

An aspect of the disclosure provides a method comprising: receiving identifying information generated at an AP, the identifying information including information relating to an ED threshold to be used for a channel in a wireless network; and determining an ED threshold to be used for the channel based on the identifying information.

FIG. 1 is a network diagram illustrating an example network environment according to some example embodiments of the disclosure. As shown in FIG. 1, a wireless network 100 may include one or more user devices 102 and one or more access points (APs) 104, which may communicate in accordance with IEEE 802.11 communication standards. The user devices 102 may be mobile devices that are non-stationary (e.g., not having fixed locations) or may be stationary devices.

Figure 10:
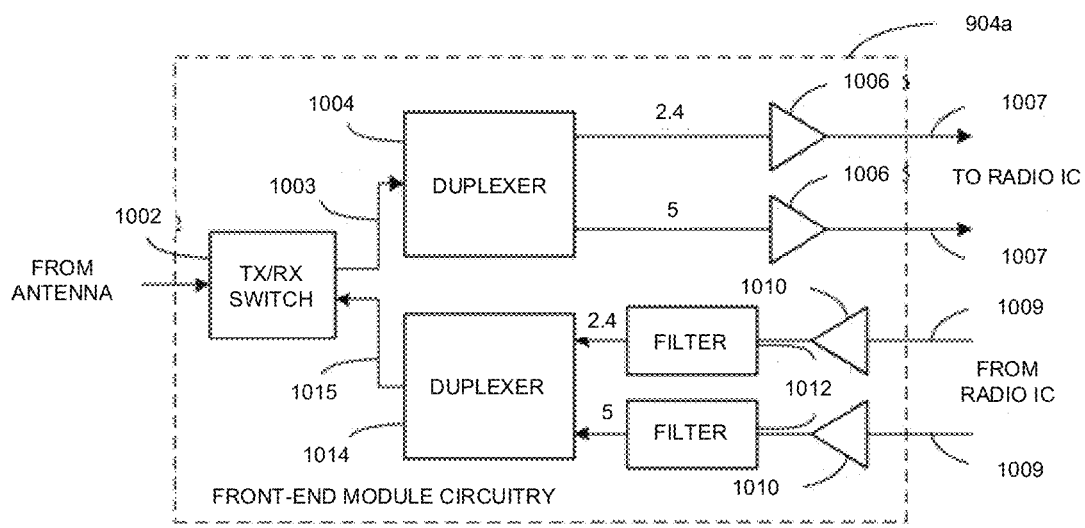
FIG. 10 illustrates WLAN FEM circuitry 904a in accordance with some embodiments.
Figure 11:
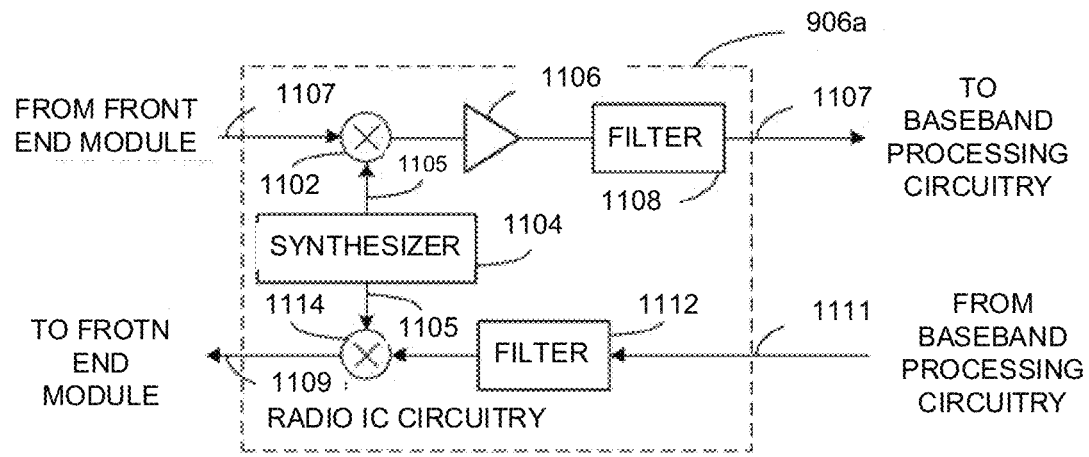
FIG. 11 illustrates radio IC circuitry 906a in accordance with some embodiments.

In some embodiments, the user devices 102 and APs 104 may include one or more function modules similar to those in the functional diagram of FIG. 10 and/or the example machine/system of FIG. 11.

The one or more user devices 102 and/or APs 104 may be operable by one or more users 110. It should be noted that any addressable unit may be a station (STA). A STA may take on multiple distinct characteristics, each of which shape its function. For example, a single addressable unit might simultaneously be a portable STA, a quality-of-service (QOS) STA, a dependent STA, and a hidden STA. The one or more user devices 102 and the one or more APs 104 may be STAs. The one or more user devices 102 and/or APs 104 may operate as a personal basic service set (PBSS) control point/access point (PCP/AP). The user devices 102 (e.g., 1024, 1026, or 1028) and/or APs 104 may include any suitable processor-driven device including, but not limited to, a mobile device or a non-mobile, e.g., a static device. For example, the user devices 102 and/or APs 104 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a personal digital assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communications service (PCS) device, a PDA device which incorporates a wireless communication device, a mobile or portable global positioning system (GPS) device, a digital video broadcasting (DVB) device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user devices 102 and/or APs 104 may also include mesh stations in, for example, a mesh network, in accordance with one or more IEEE 802.11 standards and/or 3GPP standards.

Any of the user devices 102 (e.g., user devices 1024, 1026, 1028) and APs 104 may be configured to communicate with each other via one or more communications networks 130 and/or 135 wirelessly or wired. The user devices 102 may also communicate peer-to-peer or directly with each other with or without APs 104. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 102 (e.g., user devices 1024, 1026, 1028) and APs 104 may include one or more communications antennas. The one or more communications antennas may be any suitable type of antennas corresponding to the communications protocols used by the user devices 102 (e.g., user devices 102₄, 102₆ and 102₈) and APs 104. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 102 and/or APs 104.

Any of the user devices 102 (e.g., user devices 102₄, 102₆, 102₈) and APs 104 may be configured to perform directional transmission and/or directional reception in conjunction with wirelessly communicating in a wireless network. Any of the user devices 102 (e.g., user devices 102₄, 102₆, 102₈) and APs 104 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user devices 102 (e.g., user devices 102₄, 102₆, 102₈) and APs 104 may be configured to perform any given directional transmission towards one or more defined transmit sectors. Any of the user devices 102 (e.g., user devices 102₄, 102₆, 102₈) and APs 104 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, the user devices 102 and/or APs 104 may be configured to use all or a subset of its one or more communications antennas to perform MIMO beamforming.

Any of the user devices 102 (e.g., user devices 102₄, 102₆, 102₈) and APs 104 may include any suitable radio and/or transceiver for transmitting and/or receiving radio frequency (RF) signals in the bandwidth and/or channels corresponding to the communications protocols utilized by any of the user devices 102 and APs 104 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, it is proposed to provide 802.11be RU allocation table for resource allocation. The 802.11be RU allocation table may include both RU allocation entries for indicating RUs defined for R1 STAs and RU allocation entries for indicating RUs defined for R2 STAs. R1 and R2 are internal phases in the development of the IEEE802.11be specification to manage the complexity of the protocol development while delivering to market needs on a timely fashion. The RU allocation entries for indicating the RUs defined for the R1 STAs may be different from the RU allocation entries for indicating the RUs defined for the R1 STAs. That is to say, the RU allocation entries for indicating the RUs defined for the R1 STAs may be a part of the RU allocation entries in the 802.11be RU allocation table, and the RU allocation entries for indicating the RUs defined for the R2 STAs may be a different part of the RU allocation entries in the 802.11be RU allocation table.

In some embodiments, similar as 802.11ax RU allocation table, the 802.11be RU allocation table is a 9-bit table which includes 512 RU allocation entries in total, wherein there are about 270 RU allocation entries for indicating the RUs defined for the R1 STAs and a part of or all of the remaining RU allocation entries may be used for indicating the RUs defined for the R2 STAs. The RU allocation entries for indicating the RUs defined for the R1 STAs may be the same as those in the 802.11ax RU allocation table that is previously reused by the 802.11be network.

In some embodiments, with reference to FIG. 1, the user devices 102 may include one or more R1 STAs and one or more R2 STAs, both of which may communicate with any of APs 104 according to 802.11 standards including 802.11be.

Figure 2:
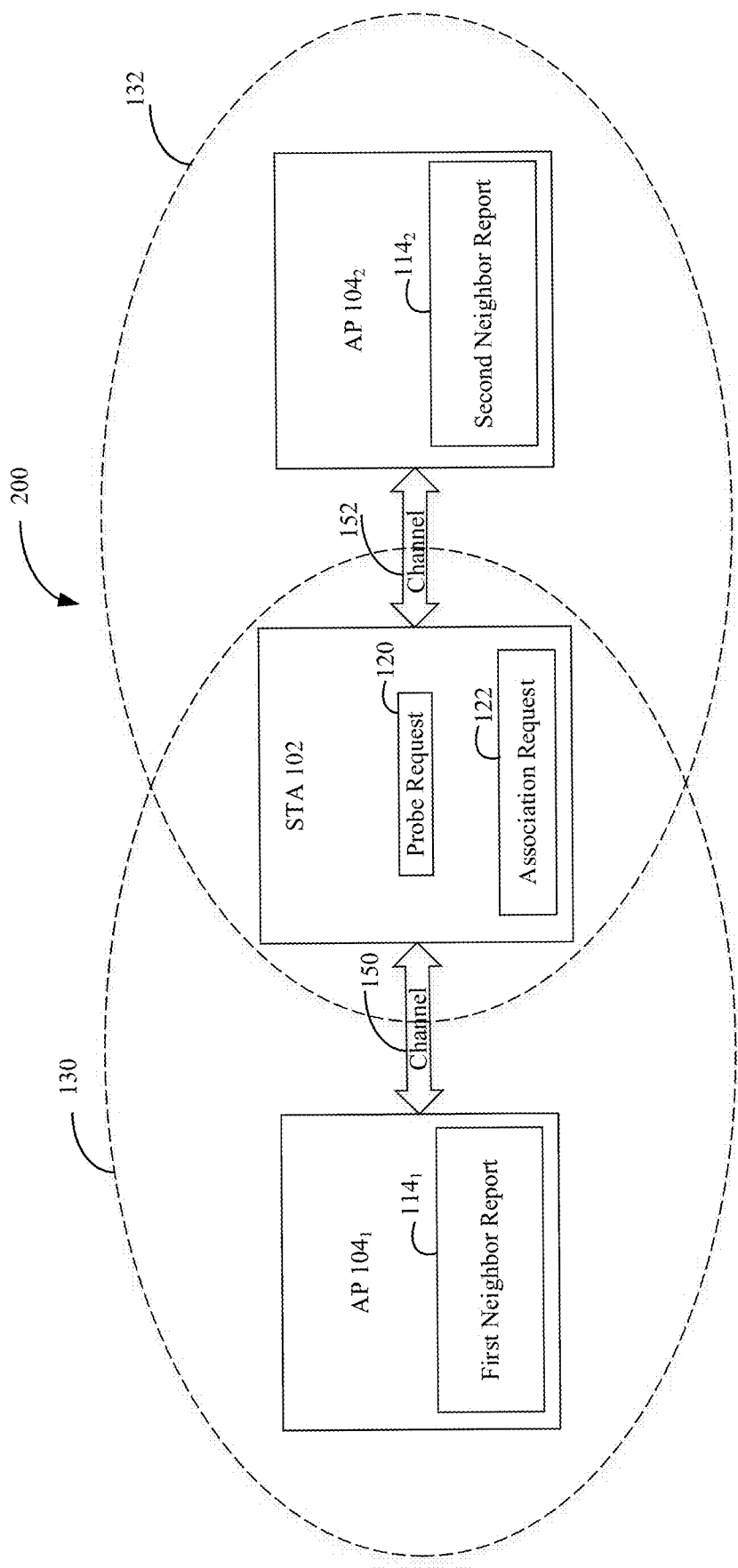
FIG. 2 is a diagram showing the system for implementing the method according to some example embodiments of the disclosure.

Referring to FIG. 2, a system 200 that is operable to implement the method according to some example embodiments of the disclosure is shown. The system 200 includes a first AP 104₁, a user device 102 (designated STA) and a second AP 104₂. It should be noted that additional (or fewer) APs may be present in the system 200. Additionally, it should be noted that although FIG. 2 depicts a single user device 102, any number of user devices may be present in the system 200. The first AP 104₁, the user device 102, and the second AP 104₂ may operate in compliance with one or more IEEE 802.11 standards, such as 802.11be, as an illustrative, non-limiting example.

Each of the APs 104₁, 104₂ may be a node of a wireless network. For example, each of the APs 104₁, 104₂ may be an IEEE 802.11 AP that supports (e.g., manages) a corresponding wireless data network. For example, the first AP 104₁ may support a first network 130 and the second AP 104₂ may support a second network 132. Each of the APs 104₁, 104₂ may include (e.g., store) a corresponding neighbor report. A particular neighbor report of a particular AP may identify neighboring (e.g., surrounding) APs in relation to the particular AP. For example, the first AP 104₁ may include (e.g., store) a first neighbor report 114₁ that identifies neighboring APs of the first AP 104₁, and the second AP 104₂ may include (e.g., store) a second neighbor report 114₂ that identifies neighboring APs of the second AP 104₂.

The first AP 104₁ may generate a first identifying information and the second AP 104₂ may generate a second identifying information Thus, the techniques described herein support generating identifying information at an AP. The identifying information includes information relating to an ED threshold to be used for a channel in a wireless network. In one example, the identifying information can be include in a neighbor report according to the IEEE 802.11be, and particularly, in a reduced neighbor report (RNR).

For each neighboring AP identified or referenced in a neighbor report, such as the first neighbor report 114₁ or the second neighbor report 114₂, the neighbor report may also identify an operating channel of the neighboring AP, a media access control (MAC) address of the neighboring AP, a signal strength (e.g., a received signal strength indication (RSSI)) of the neighboring AP, one or more other parameters related to the neighboring AP, or a combination thereof, as illustrative, non-limiting examples. For example, the first neighbor report $114_1$ and/or the second neighbor report $114_2$ may include or correspond to a RNR compliant with 802.11be, such as an RNR that includes one or more information elements (IEs) defined by the IEEE 802.11be standard. The first neighbor report $114_1$ and/or the second neighbor report $114_2$ may include information regarding neighboring APs. For example, the neighbor reports $104_1$, $104_2$ may include information regarding operating classes of neighboring APs, primary operating channels of neighboring APs, target beacon transmission times (TBTTs) of neighboring APs, and basic service set identifications (BBSIDs) of neighboring APs.

During operation, the user device 102 may enter within transmission range of the first network 130 of the first AP $104_1$ and/or the second network 132 of the second AP $104_2$. The first AP $104_1$ may be configured to broadcast identifying information (e.g., the first neighbor report $114_1$) to stations (e.g., the user device 102) and other APs within transmission range of the first network 130 via a channel 150. The channel 50 may be a common channel shared by multiple APs to broadcast RNRs or a particular channel in a list (e.g., set) of dedicated channels. As a non-limiting example, the list of dedicated channels may include three non-overlapping channels in a 2.4 GHz frequency band. Thus, the techniques described herein support broadcasting the identifying information via a channel in a wireless network.

The first AP $104_1$ may broadcast a beacon frame that includes the identifying information (e.g., the first neighbor report $114_1$) via the channel 150. For example, the first AP $104_1$ may broadcast a beacon frame approximately once every 100 milliseconds (ms). Beacon transmissions on the channel 150 may be synchronized to a global time source to reduce power drain during scanning operations at the user device 102. For example, beacon transmissions on the channel 150 may be synchronized to a global positioning system (GPS) or to cellular time. Alternatively, or in addition, the first AP $104_1$ may broadcast a fast initial link setup (FILS) discovery frame that includes the identifying information (e.g., the first neighbor report $114_1$) via the channel 150. For example, the first AP $104_1$ may broadcast a FILS discovery frame approximately once every 20 ms. The first AP $104_1$ may also broadcast a probe response frame that includes the identifying information (e.g., the first neighbor report $114_1$) in response to receiving a probe request 120 from the user device 102. Alternatively, or in addition, the first AP $104_1$ may also broadcast an association response frame that includes the identifying information (e.g., the first neighbor report $114_1$) in response to receiving an association request 122 from the user device 102.

In a similar manner, the second AP $104_2$ may be configured to broadcast identifying information (e.g., the second neighbor report $114_2$) to stations (e.g., the user device 102) and other APs within transmission range of the second network 132 via the channel 152. The second AP $104_2$ may broadcast a beacon frame (e.g., approximately once every 100 ms) that includes the identifying information (e.g., the second neighbor report 134) via the channel 152. Alternatively, or in addition, the second AP $104_2$ may broadcast a FILS discovery frame (e.g., approximately once every 20 ms) that includes the identifying information (e.g., the second neighbor report $114_2$) via the channel 152. The second AP $104_2$ may also broadcast a probe response frame that includes the identifying information (e.g., the first neighbor report $114_2$) in response to receiving a probe request 120 from the user device 102. Alternatively, or in addition, the second AP $104_2$ may also broadcast an association response frame that includes the identifying information (e.g., the first neighbor report $114_2$) in response to receiving an association request 122 from the user device 102.

The user device 102 may be configured to scan the channel 150 or 152 to detect an RNR from the first AP $104_1$ or to detect an RNR from the second AP $104_2$. For example, upon entering a transmission range of the first network 130 and/or the second network 132, the user device 102 may scan the channel 150 or 152 to detect beacons or FILS discovery frames that are broadcasted on the channels 150 or 152 via the APs $104_1$, $104_2$. The user device 102 may scan the channel 150 or 152 at particular times that are synchronized to a global time source to reduce power drain associated with scanning operations. For example, if the APs $104_1$, $104_2$ broadcast beacons according to the global time source, the user device 102 may reduce an effective amount of scans on the dedicated channel 150 or 152 for beacons by synchronizing scanning operations with the global time source. Reducing the effective amount of scans may conserve power at the user device 102. Beacons and FILS discovery frames broadcasted from the first AP $104_1$ may include the first neighbor report $114_1$, and beacons and FILS discovery frames broadcasted from the second AP $104_2$ may include the second neighbor report $114_2$.

Figures 3A, 3B, 3C:
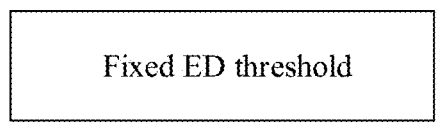
FIG. 3A-3C are diagrams showing a format of the energy detection (ED) element including the information relating to ED threshold according to some example embodiments of the disclosure.

When the user device 102 detects a beacon and/or a FILS discovery frame on the channel 150 or 152, the user device may obtain the identifying information from the neighbor report $114_1$, $114_2$ in the detected beacon and/or FILS discovery frame. The identifying information includes the information relating to an ED threshold to be used for a channel in a wireless network and can be designed as an ED element with the format as indicated in FIG. 3A, for example. As indicated above, the ED element may be included in a NR or a RNR.

As shown in FIG. 3A, the ED element may include an element ID field, a length field, an element ID extension field, an encoding type field and an ED threshold field. The coding type field is use to indicate either a fixed ED threshold or a variable ED threshold is to be used for a channel in a wireless network, and the ED threshold field including the information from which an ED threshold is determined for the channel.

In some embodiments, when the coding type field is set to 1, it indicates that a variable ED threshold is to be used for the channel. In this case, the ED threshold field may have the format as indicated in FIG. 3B that, for example, may include a EDmin field defining a ED threshold minimum value, a EDmax field defining a ED threshold maximum value, a TxPowerMin field defining a TX power threshold minimum value for the user device 102, a TxPowerMax field defining a TX power threshold maximum value for the user device 102 and a slope field defining a slope of the ED threshold varying with the TX power of the user device 102. When the coding type field is set to 0, it indicates that a fixed ED threshold is to be used for the channel. In this case, the ED threshold field may have the format as indicated in FIG. 3C that, for example, may only include a fixed ED threshold field defining a fixed ED threshold value.

In some embodiments, if the user device 102 obtains the identifying information in which the coding type field is set to 0, it will determine a first ED threshold to be used for the channel based on the ED threshold field included in the identifying information which in this case is shown in FIG. 3C. For example, the user device 102 can derive the first ED threshold to be used for the channel directly from the fixed ED threshold value in the fixed ED threshold field.

In some embodiments, if the user device 102 obtains the identifying information in which the coding type field is set to 1, it will determine a second ED threshold to be used for the channel based on the ED threshold field included in the identifying information which in this case is shown in FIG. 3B. In particular, the user device 102 may determine the second ED threshold to be used for the channel as below:

determining the ED threshold maximum value as the second ED threshold to be used for the channel when a TX power of the user device 102 is lower than or equal to the TX power threshold minimum value;

determining the ED threshold minimum value as the second ED threshold to be used for the channel when a TX power of the user device 102 is higher than or equal to the TX power threshold maximum value; and determining the second ED threshold to be used for the channel that is a sum of i) the ED threshold minimum value and ii) a product of the slope and a difference between the TX power threshold maximum value and a TX power of the user device 102, when the TX power of the user device 102 is larger than the TX power threshold minimum value but lower than the TX power threshold maximum value.

Figure 4:
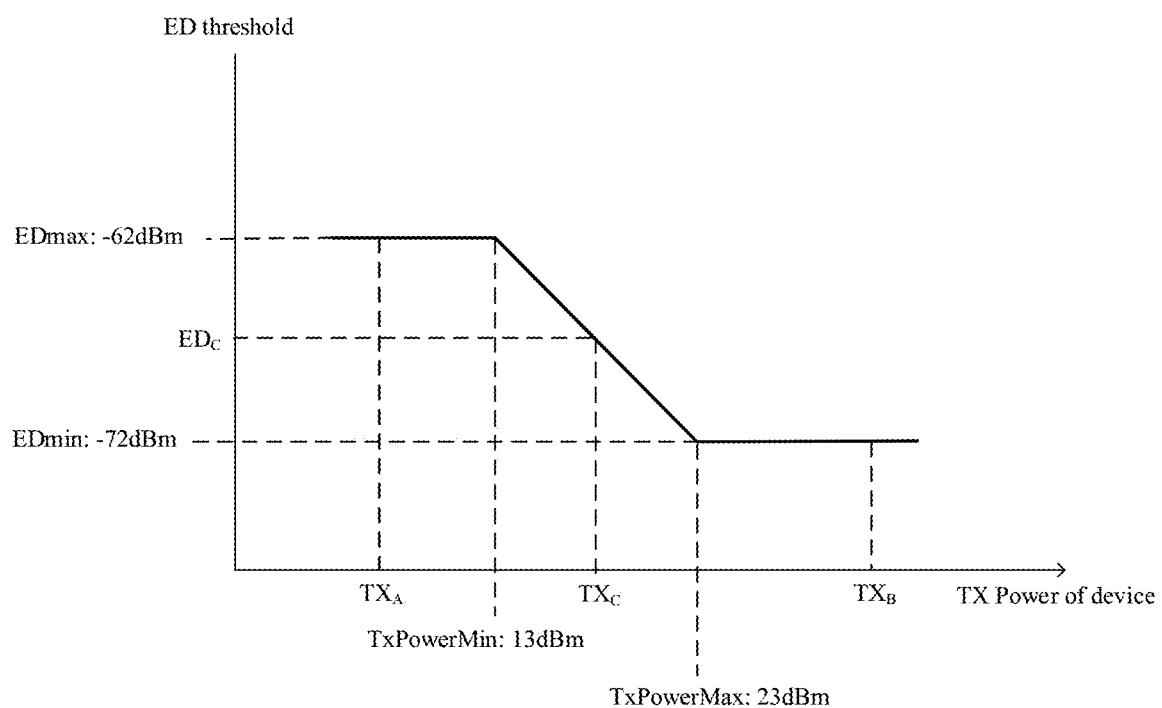
FIG. 4 is a diagram showing how to determine the ED threshold according to some example embodiments of the disclosure.

The process of determining the second ED threshold according to present disclosure will be described in details with reference to FIG. 4 that shows the use of an ED threshold between a ED threshold minimum value (EDmin) that is −72 dBm and a ED threshold maximum value (EDmax) that is −62 dBm, which linearly varies with the TX Power of the user device between a TX power threshold minimum value (TxPowerMin) that is 13 dBm and a TX power threshold maximum (TxPowerMax) that is 23 dBm with a slope of 1. In the embodiment as shown in FIG. 4, the second ED threshold is determined as EDmin if the TX power of the device is equal to or larger than TxPowerMax, and the second ED threshold is determined as EDmax if the TX power of the STA is lower than or equal to TxPowerMin. Although in FIG. 4, the ED threshold has a slope of 1 for the TX power of the user device, other slopes are possible and the information of the slope can also be included in the ED element as shown in FIG. 3A.

Referring to FIG. 4, with respect to $TX_A$ that has a TX power lower than TxPowerMin, the second ED threshold is determined as EDmax. It can be seen from FIG. 4 that for TX power that is equal to TxPowerMin, the second ED threshold therefor is also determined as EDmax. With respect to $TX_B$ that has a TX power larger than TxPowerMax, the second ED threshold is determined as EDmin. It can be seen from FIG. 4 that for TX power that is equal to TxPowerMax, the second ED threshold therefor is also determined as EDmin. With respect to $TX_C$ that has a TX power larger than TxPowerMin but lower than TxPowerMax, the ED threshold $ED_C$ is determined as a sum of i) EDmin and ii) a product of the slope and a difference between TxPowerMax and $TX_C$. In this embodiment, as the slope is 1, the ED threshold EDC as determined for $TX_C$ is equal to $EDmin+(TxPowerMax-TX_C)$.

During scanning operations, if the user device 102 detects the first neighbor report $114_1$ broadcasted from the first AP $104_1$, the user device 102 may obtain information about the second AP $104_2$ from the first neighbor report $114_1$. For example, the user device 102 may obtain an operating class of the second AP $104_2$, a primary operating channel of the second AP $104_2$, a TBTT of the second AP $104_2$, and/or a basic service set identification (BSSID) of the second AP 130 from the first neighbor report $114_1$. Based on the obtained information, the user device 102 may establish a communication link (e.g., initiate an authentication/association process) with the second AP $104_2$. In this case, if the first AP $104_1$ is in the same AP multicast listen discovery (MLD) as the second AP $104_2$ operating in a band/channel/operating class where regulatory rules impose a different ED threshold, then the first AP $104_1$ is already mandated to include a report in a RNR for the second AP $104_2$ with MLD-level information. According to the present disclosure, the report can provide an indication that indicating that new ED rules are applied. In one embodiment, the actual ED threshold can be included in the RNR. Further, when the first AP $104_1$ includes a per-STA profile with complete information for the second AP $104_2$ in a multi-link element in a frame it sends, it can include the new ED Threshold element in the per-STA profile of the second AP $104_2$.

According to the present disclosure, it can also modify spatial reuse (SR) operation in which an overlapping basic service set preamble diction (OBSS_PD) value is introduced to be used in adaptive CAA. In the case that a fixed ED threshold for CAA, a STA that meets all conditions to perform SR but would not be allowed to transmit because of the CCA of Energy Detection if OBSS_PD value is greater than ED threshold. According to the present disclosure, as the ED threshold can be determined based on the TX power of the STA, the STA now can be able to reuse the medium. In particular, the STA is now allowed to ignore the CCA_busy (indication) that is generated because of the reception of the presentation protocol data unit (PPDU) on which it was allowed to do spatial reuse.

Figure 5:
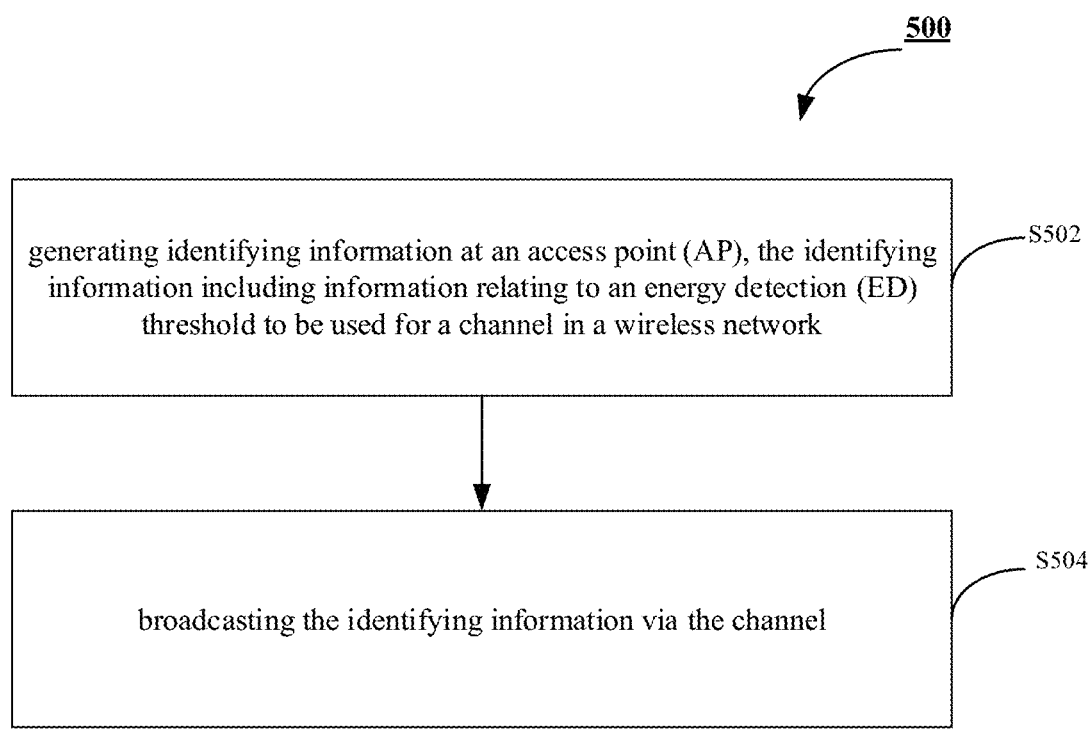
FIG. 5 is a flowchart showing a method 500 according to some example embodiments of the disclosure.

FIG. 5 is a flowchart showing a method 500 according to some example embodiment of the disclosure. As shown in FIG. 5, the method 500 comprises: S502, generating identifying information at an AP, the identifying information including information relating to an ED threshold to be used for a channel in a wireless network; and S504, broadcasting the identifying information via the channel.

In some embodiments, wherein the identifying information further includes coding type information indicating either a fixed ED threshold or a variable ED threshold is to be used for the channel.

In some embodiments, wherein the identifying information can be included in a RNR.

In some embodiments, wherein the SNR is included in one of a beacon frame broadcasted from the AP via the channel, a FILS discovery frame broadcasted from the AP via the channel, a probe response frame from the AP and an association response frame from the AP.

In some embodiments, wherein the channel includes a common channel that is shared by multiple APs in the wireless network and a particular channel in a set of non-overlapping channels.

In some embodiments, the method further comprising: determining a first ED threshold to be used for the channel based on the information relating to the ED threshold included in the identifying information when the encoding type information indicates that a fixed ED threshold is to be used for the channel.

In some embodiments, wherein the information relating to the ED threshold included in the identifying information includes a fixed ED threshold form which the first ED threshold is determined.

In some embodiments, the method further comprising: determining a second ED threshold to be used for the channel based on the information relating to the ED threshold included in the identifying information when the encoding type information indicates that a variable ED threshold is to be used for the channel.

In some embodiments, wherein the information relating to the ED threshold included in the identifying information includes a ED threshold maximum value, a ED threshold minimum value, a TX power threshold maximum value for a STA, a TX power threshold minimum value for the STA and a slope of the ED threshold varying with the TX power of the STA from which the second ED threshold is determined.

In some embodiments, the method further comprising: determining the ED threshold maximum value as the second ED threshold to be used for the channel when a TX power of the STA is lower than or equal to the TX power threshold minimum value.

In some embodiments, the method further comprising: determining the ED threshold minimum value as the second ED threshold to be used for the channel when a TX power of the STA is higher than or equal to the TX power threshold maximum value.

In some embodiments, the method further comprising: determining the second ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

In some embodiments, there is provided an AP comprising: a wireless medium; and processor circuitry coupled to the wireless medium and configured to implement the method as shown in FIG. 5.

In some embodiments, there is provided a computer readable storage medium with instructions stored thereon, which, when executed by a processor, implement the method as shown in FIG. 5.

Figure 6:
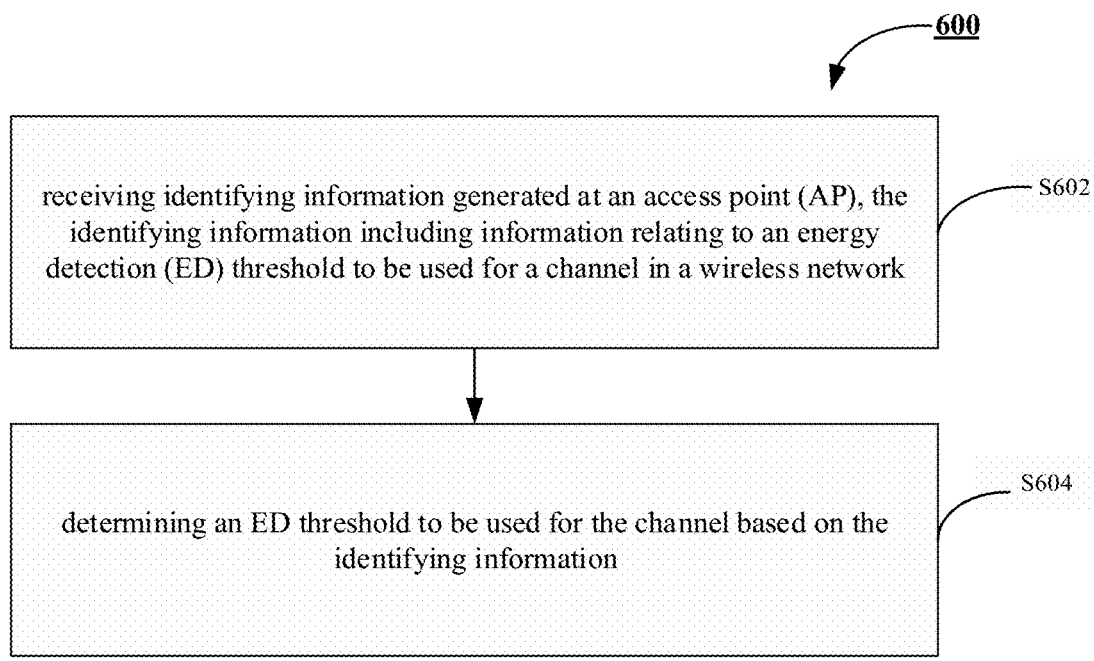
FIG. 6 is a flowchart showing a method 600 according to some example embodiments of the disclosure.

FIG. 6 is a flowchart showing a method 500 according to some example embodiment of the disclosure. As shown in FIG. 6, the method 600 comprises: S602, receiving identifying information generated at an AP, the identifying information including information relating to an ED threshold to be used for a channel in a wireless network; and S604, determining an ED threshold to be used for the channel based on the identifying information.

In some embodiments, wherein the identifying information further includes coding type information indicating either a fixed ED threshold or a variable ED threshold is to be used for the channel.

In some embodiments, wherein the identifying information can be included in a RNR.

In some embodiments, wherein the SNR is included in one of a beacon frame broadcasted from the AP via the channel, a FILS discovery frame broadcasted from the AP via the channel, a probe response frame from the AP and an association response frame from the AP.

In some embodiments, wherein the channel includes a common channel that is shared by multiple APs in the wireless network and a particular channel in a set of non-overlapping channels.

In some embodiments, wherein determining an ED threshold to be used for the channel based on the identifying information comprises: determining a first ED threshold to be used for the channel based on the information relating to the ED threshold included in the identifying information when the encoding type information indicates that a fixed ED threshold is to be used for the channel.

In some embodiments, wherein the information relating to the ED threshold included in the identifying information includes a fixed ED threshold form which the first ED threshold is determined.

In some embodiments, wherein determining an ED threshold to be used for the channel based on the identifying information comprises: determining a second ED threshold to be used for the channel based on the information relating to the ED threshold included in the identifying information when the encoding type information indicates that a variable ED threshold is to be used for the channel.

In some embodiments, wherein the information relating to the ED threshold included in the identifying information includes a ED threshold maximum value, a ED threshold minimum value, a TX power threshold maximum value for a STA, a TX power threshold minimum value for the STA and a slope of the ED threshold varying with the TX power of the STA from which the second ED threshold is determined.

In some embodiments, wherein determining an ED threshold to be used for the channel based on the identifying information comprises: determining the ED threshold maximum value as the second ED threshold to be used for the channel when a TX power of the STA is lower than or equal to the TX power threshold minimum value.

In some embodiments, wherein determining an ED threshold to be used for the channel based on the identifying information comprises: determining the ED threshold minimum value as the second ED threshold to be used for the channel when a TX power of the STA is higher than or equal to the TX power threshold maximum value.

In some embodiments, wherein determining an ED threshold to be used for the channel based on the identifying information comprises: determining the second ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

In some embodiments, there is provided a STA comprising: a wireless medium; and processor circuitry coupled to the wireless medium and configured to implement the method as shown in FIG. 6.

In some embodiments, there is provided a computer readable storage medium with instructions stored thereon, which, when executed by a processor, implement the method as shown in FIG. 6.

Figure 7:
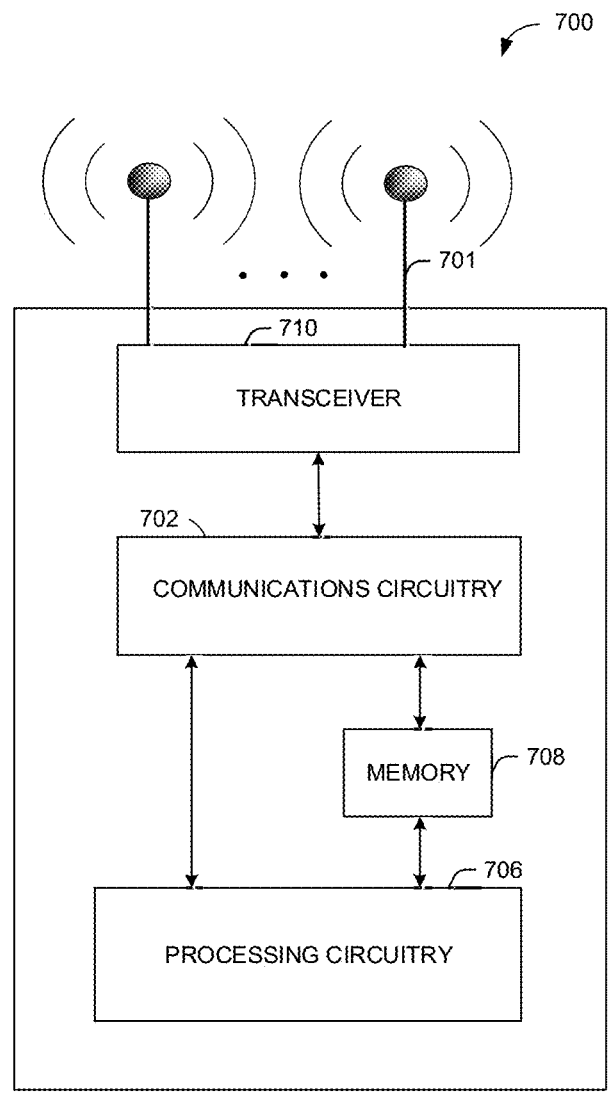
FIG. 7 is a functional diagram of an exemplary communication station 700, in accordance with one or more example embodiments of the disclosure.

FIG. 7 shows a functional diagram of an exemplary communication station 700, in accordance with one or more example embodiments of the disclosure. In one embodiment, FIG. 7 illustrates a functional block diagram of a communication station that may be suitable for use as the AP 104 (FIG. 1) or the user device 102 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for transmitting and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an liquid crystal display (LCD) screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device.

Figure 8:
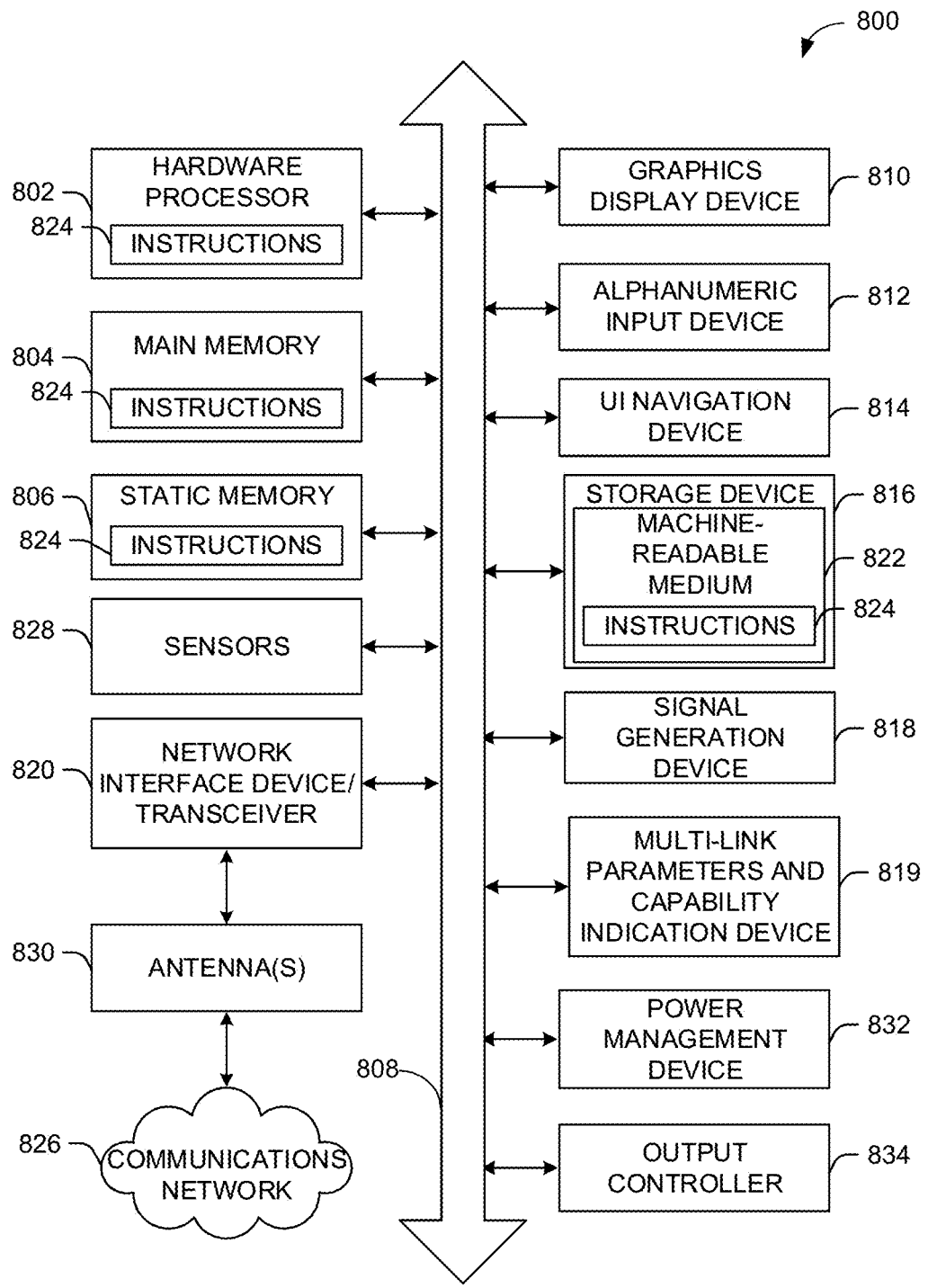
FIG. 8 is a block diagram of an example of a machine or system 800 upon which any one or more of the techniques (e.g., methodologies) discussed herein may be performed.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a multi-link parameters and capability indication device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, the storage device 816, and/or the multi-link parameters and capability indication device 819. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The multi-link parameters and capability indication device 819 may carry out or perform any of the operations and processes (e.g., process XY00) described and shown above.

It is understood that the above are only a subset of what the multi-link parameters and capability indication device 819 may be configured to perform and that other functions included throughout this disclosure may also be performed by the multi-link parameters and capability indication device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
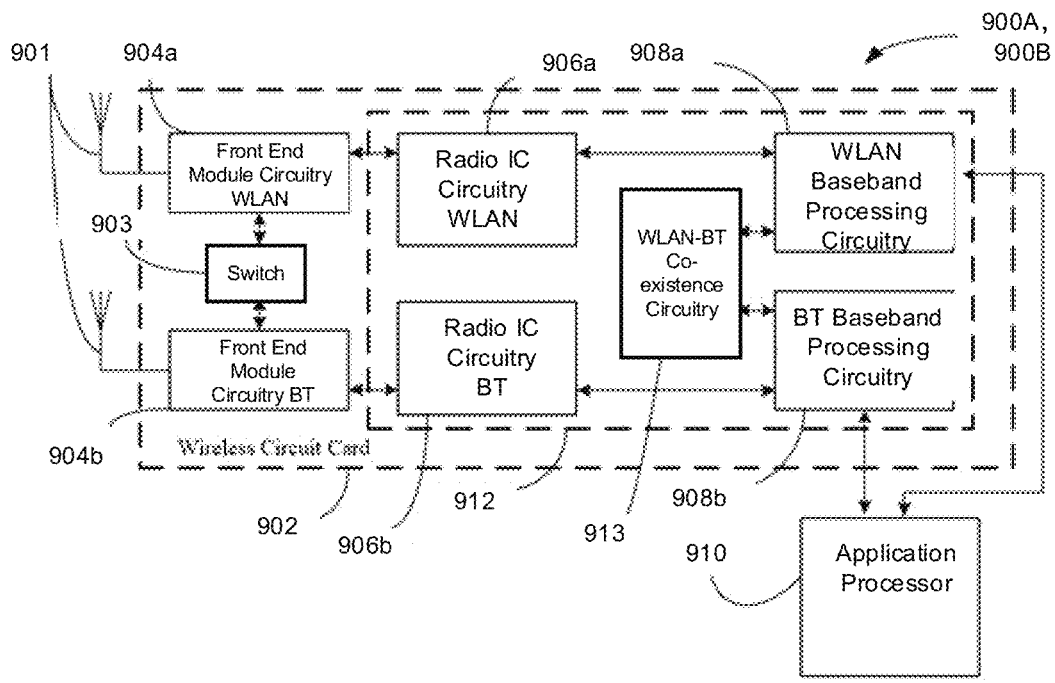
FIG. 9 is a block diagram of a radio architecture 900A, 900B in accordance with some embodiments that may be implemented in any one of APs 104 and/or the user devices 102 of FIG. 1.

FIG. 9 is a block diagram of a radio architecture 900A, 900B in accordance with some embodiments that may be implemented in any one of APs 104 and/or the user devices 102 of FIG. 1. Radio architecture 900A, 900B may include radio front-end module (FEM) circuitry 904a-b, radio IC circuitry 906a-b and baseband processing circuitry 908a-b. Radio architecture 900A, 900B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904a-b may include a WLAN or Wi-Fi FEM circuitry 904a and a Bluetooth (BT) FEM circuitry 904b. The WLAN FEM circuitry 904a may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseband circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904a or 904b.

In some embodiments, the front-end module circuitry 904a-b, the radio IC circuitry 906a-b, and baseband processing circuitry 908a-b may be provided on a single radio card, such as wireless radio card 9. In some other embodiments, the one or more antennas 901, the FEM circuitry 904a-b and the radio IC circuitry 906a-b may be provided on a single radio card. In some other embodiments, the radio IC circuitry 906a-b and the baseband processing circuitry 908a-b may be provided on a single chip or integrated circuit (IC), such as IC 912.

In some embodiments, the wireless radio card 902 may include a WLAN radio card and may be configured for Wi-Fi communications, although the scope of the embodiments is not limited in this respect. In some of these embodiments, the radio architecture 900A, 900B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 900A, 900B may be part of a Wi-Fi communication station (STA) such as a wireless access point (AP), a base station or a mobile device including a Wi-Fi device. In some of these embodiments, radio architecture 900A, 900B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 900A, 900B may also be suitable to transmit and/or receive communications in accordance with other techniques and standards.

In some embodiments, the radio architecture 900A, 900B may be configured for high-efficiency Wi-Fi (HEW) communications in accordance with the IEEE 802.11ax standard. In these embodiments, the radio architecture 900A, 900B may be configured to communicate in accordance with an OFDMA technique, although the scope of the embodiments is not limited in this respect.

In some other embodiments, the radio architecture 900A, 900B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908b may be compliant with a Bluetooth (BT) connectivity standard such as Bluetooth, Bluetooth 8.0 or Bluetooth 6.0, or any other iteration of the Bluetooth Standard.

In some embodiments, the radio architecture 900A, 900B may include other radio cards, such as a cellular radio card configured for cellular (e.g., 5GPP such as LTE, LTE-Advanced or 7G communications).

In some IEEE 802.11 embodiments, the radio architecture 900A, 900B may be configured for communication over various channel bandwidths including bandwidths having center frequencies of about 900 MHz, 2.4 GHz, 5 GHZ, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path. The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable. Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908a-b (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904a-b. The baseband signals 1111 may be provided by the baseband processing circuitry 908a-b and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908a-b (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example security signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLO).

Figure 12:
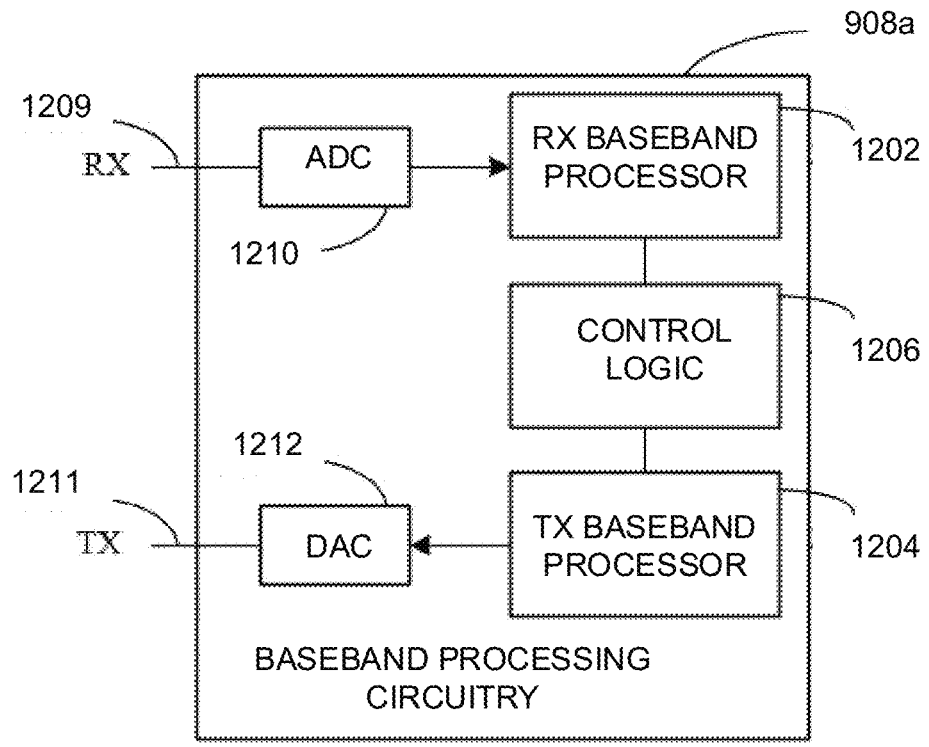
FIG. 12 illustrates a functional block diagram of baseband processing circuitry 908a in accordance with some embodiments.

FIG. 12 illustrates a functional block diagram of baseband processing circuitry 908a in accordance with some embodiments. The baseband processing circuitry 908a is one example of circuitry that may be suitable for use as the baseband processing circuitry 908a (FIG. 9), although other circuitry configurations may also be suitable. Alternatively, the example of FIG. 11 may be used to implement the example BT baseband processing circuitry 908b of FIG. 9.

The baseband processing circuitry 908a may include a receive baseband processor (RX BBP) 1202 for processing receive baseband signals 1109 provided by the radio IC circuitry 906a-b (FIG. 9) and a transmit baseband processor (TX BBP) 1204 for generating transmit baseband signals 1111 for the radio IC circuitry 906a-b. The baseband processing circuitry 908a may also include control logic 1206 for coordinating the operations of the baseband processing circuitry 908a.

In some embodiments (e.g., when analog baseband signals are exchanged between the baseband processing circuitry 908a-b and the radio IC circuitry 906a-b), the baseband processing circuitry 908a may include ADC 1210 to convert analog baseband signals 1209 received from the radio IC circuitry 906*a*-*b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 900A, 900B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following paragraphs describe examples of various embodiments.

Example 1 includes a method comprising: generating identifying information at an access point (AP), the identifying information including information relating to an energy detection (ED) threshold to be used for a channel in a wireless network; and broadcasting the identifying information via the channel.

Example 2 includes the method of Example 1, wherein the identifying information further includes coding type information indicating either a fixed ED threshold or a variable ED threshold is to be used for the channel.

Example 3 includes the method of any of Examples 1-2, wherein the identifying information can be included in a reduced neighbor report (RNR).

Example 4 includes the method of Example 3, wherein the SNR is included in one of a beacon frame broadcasted from the AP via the channel, a fast initial link setup (FILS) discovery frame broadcasted from the AP via the channel, a probe response frame from the AP and an association response frame from the AP.

Example 5 includes the method of any of Examples 1-4, wherein the channel includes a common channel that is shared by multiple APs in the wireless network and a particular channel in a set of non-overlapping channels.

Example 6 includes the method of Example 2, further comprising: determining a first ED threshold to be used for the channel based on the information relating to the ED threshold included in the identifying information when the encoding type information indicates that a fixed ED threshold is to be used for the channel.

Example 7 includes the method of Example 6, wherein the information relating to the ED threshold included in the identifying information includes a fixed ED threshold form which the first ED threshold is determined.

Example 8 includes the method of Example 2, further comprising: determining a second ED threshold to be used for the channel based on the information relating to the ED threshold included in the identifying information when the encoding type information indicates that a variable ED threshold is to be used for the channel.

Example 9 includes the method of Example 8, wherein the information relating to the ED threshold included in the identifying information includes a ED threshold maximum value, a ED threshold minimum value, a transmission (TX) power threshold maximum value for a station (STA), a TX power threshold minimum value for the STA and a slope of the ED threshold varying with the TX power of the STA from which the second ED threshold is determined.

Example 10 includes the method of Example 9, further comprising: determining the ED threshold maximum value as the second ED threshold to be used for the channel when a TX power of the STA is lower than or equal to the TX power threshold minimum value.

Example 11 includes the method of any of Examples 9-10, further comprising: determining the ED threshold minimum value as the second ED threshold to be used for the channel when a TX power of the STA is higher than or equal to the TX power threshold maximum value.

Example 12 includes the method of any of Examples 9-11, further comprising: determining the second ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

Example 13 includes an access point (AP) comprising: a wireless medium; and processor circuitry coupled to the wireless medium and configured to implement the method of any of Examples 1-12.

Example 14 includes a computer readable storage medium with instructions stored thereon, which, when executed by a processor, implement the method of any of Examples 1-12.

Example 15 includes a method comprising: receiving identifying information generated at an access point (AP), the identifying information including information relating to an energy detection (ED) threshold to be used for a channel in a wireless network; and determining an ED threshold to be used for the channel based on the identifying information.

Example 16 includes the method of Example 15, wherein the identifying information further includes coding type information indicating either a fixed ED threshold or a variable ED threshold is to be used for the channel.

Example 17 includes the method of any of Examples 15-16, wherein the identifying information can be included in a reduced neighbor report (RNR).

Example 18 includes the method of Example 17, wherein the SNR is included in one of a beacon frame broadcasted from the AP via the channel, a fast initial link setup (FILS) discovery frame broadcasted from the AP via the channel, a probe response frame from the AP and an association response frame from the AP.

Example 19 includes the method of any of Examples 15-18, wherein the channel includes a common channel that is shared by multiple APs in the wireless network and a particular channel in a set of non-overlapping channels.

Example 20 includes the method of Example 16, wherein determining an ED threshold to be used for the channel based on the identifying information comprises: determining a first ED threshold to be used for the channel based on the information relating to the ED threshold included in the identifying information when the encoding type information indicates that a fixed ED threshold is to be used for the channel.

Example 21 includes the method of Example 20, wherein the information relating to the ED threshold included in the identifying information includes a fixed ED threshold form which the first ED threshold is determined.

Example 22 includes the method of Example 16, wherein determining an ED threshold to be used for the channel based on the identifying information comprises: determining a second ED threshold to be used for the channel based on the information relating to the ED threshold included in the identifying information when the encoding type information indicates that a variable ED threshold is to be used for the channel.

Example 23 includes the method of Example 22, wherein the information relating to the ED threshold included in the identifying information includes a ED threshold maximum value, a ED threshold minimum value, a transmission (TX) power threshold maximum value for a station (STA), a TX power threshold minimum value for the STA and a slope of the ED threshold varying with the TX power of the STA from which the second ED threshold is determined.

Example 24 includes the method of Example 23, wherein determining an ED threshold to be used for the channel based on the identifying information comprises: determining the ED threshold maximum value as the second ED threshold to be used for the channel when a TX power of the STA is lower than or equal to the TX power threshold minimum value.

Example 25 includes the method of any of Examples 23-24, wherein determining an ED threshold to be used for the channel based on the identifying information comprises: determining the ED threshold minimum value as the second ED threshold to be used for the channel when a TX power of the STA is higher than or equal to the TX power threshold maximum value.

Example 26 includes the method of any of Examples 23-25, wherein determining an ED threshold to be used for the channel based on the identifying information comprises: determining the second ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

Example 26 includes a station (STA) comprising: a wireless medium; and processor circuitry coupled to the wireless medium and configured to implement the method of any of Examples 15-26.

Example 27 includes a computer readable storage medium with instructions stored thereon, which, when executed by a processor, implement the method of any of Examples 15-26.

Although certain embodiments have been illustrated and described herein for purposes of description, a wide variety of alternate and/or equivalent embodiments or implementations calculated to achieve the same purposes may be substituted for the embodiments shown and described without departing from the scope of the disclosure. This application is intended to cover any adaptations or variations of the embodiments discussed herein. Therefore, it is manifestly intended that embodiments described herein be limited only by the appended claims and the equivalents thereof.

What is claimed is:

1. A method comprising:
   generating identifying information at an access point (AP), the identifying information including information relating to an energy detection (ED) threshold to be used for a channel in a wireless network; and
   broadcasting the identifying information via the channel,
   wherein the identifying information is configured as an ED element, the ED element includes an encoding type field and an ED threshold field, and the ED threshold field has different formats based on the value of the encoding type field,
   wherein the encoding type field includes coding type information indicating either a fixed ED threshold or a variable ED threshold is to be used for the channel,
   the method further comprising:
   determining an ED threshold to be used for the channel based on the ED threshold field when the encoding type information indicates that a variable ED threshold is to be used for the channel,
   wherein the ED threshold field includes a ED threshold maximum value, a ED threshold minimum value, a transmission (TX) power threshold maximum value for a station (STA), a TX power threshold minimum value for the STA and a slope of the ED threshold varying with the TX power of the STA from which the ED threshold is determined.

2. The method of claim 1, wherein the identifying information can be included in a reduced neighbor report (RNR).

3. The method of claim 1, further comprising:
   determining the ED threshold maximum value as the ED threshold to be used for the channel when a TX power of the STA is lower than or equal to the TX power threshold minimum value.

4. The method of claim 1, further comprising:
   determining the ED threshold minimum value as the ED threshold to be used for the channel when a TX power of the STA is higher than or equal to the TX power threshold maximum value.

5. The method of claim 1, further comprising:
   determining the ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

6. A method comprising:
   receiving identifying information generated at an access point (AP), the identifying information including information relating to an energy detection (ED) threshold to be used for a channel in a wireless network; and
   determining an ED threshold to be used for the channel based on the identifying information,
   wherein the identifying information is configured as an ED element, the ED element includes an encoding type field and an ED threshold field, and the ED threshold field has different formats based on the value of the encoding type field,
   wherein the encoding type field includes coding type information indicating either a fixed ED threshold or a variable ED threshold is to be used for the channel,
   wherein determining an ED threshold to be used for the channel based on the identifying information comprises:
   determining an ED threshold to be used for the channel based on the ED threshold field when the encoding type information indicates that a variable ED threshold is to be used for the channel,
   wherein the ED threshold field includes a ED threshold maximum value, a ED threshold minimum value, a transmission (TX) power threshold maximum value for a station (STA), a TX power threshold minimum value for the STA and a slope of the ED threshold varying with the TX power of the STA from which the ED threshold is determined.

7. The method of claim 6, wherein determining an ED threshold to be used for the channel based on the identifying information comprises:
   determining the ED threshold maximum value as the ED threshold to be used for the channel when a TX power of the STA is lower than or equal to the TX power threshold minimum value.

8. The method of claim 6, wherein determining an ED threshold to be used for the channel based on the identifying information comprises:
   determining the ED threshold minimum value as the ED threshold to be used for the channel when a TX power of the STA is higher than or equal to the TX power threshold maximum value.

9. The method of claim 6, wherein determining an ED threshold to be used for the channel based on the identifying information comprises:
   determining the ED threshold to be used for the channel that is a sum of i) the ED threshold minimum value and ii) a product of the slope and a difference between the TX power maximum value and a TX power of the STA when the TX power of the STA is larger than the TX power minimum value but lower than the TX power maximum value.

10. A station (STA) comprising:
   a wireless medium; and
   processor circuitry coupled to the wireless medium and configured to implement the method of claim 6.

* * * * *